(No Model.)
W. WIMPEE.
Combined Clod Cutter and Harrow.
No. 233,056. Patented Oct. 5, 1880.
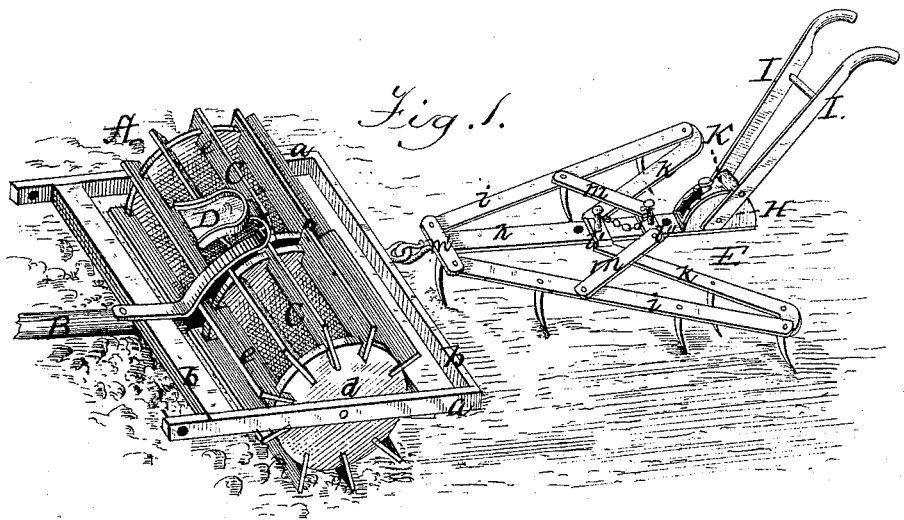
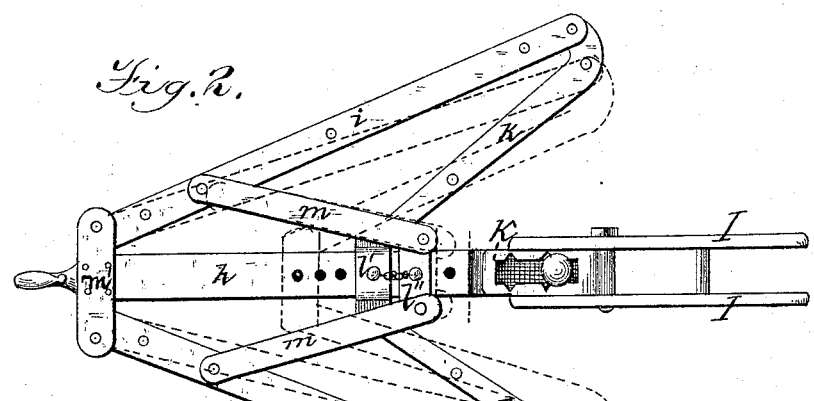
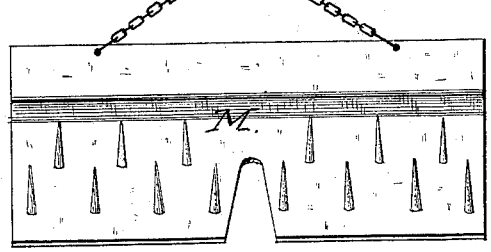
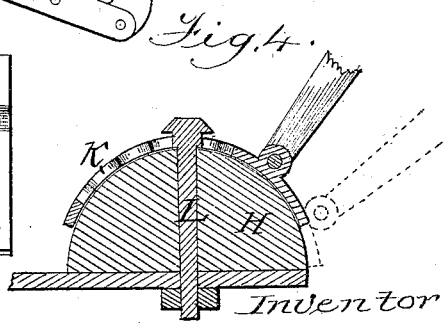
Witnesses:
J. Walter Fowler,
Clarence L. Trevith
Inventor:
William Wimpee
by Heylmun & Kane
Attorneys

UNITED STATES PATENT OFFICE.

WILLIAM WIMPEE, OF ROME, GEORGIA.

COMBINED CLOD-CUTTER AND HARROW.

SPECIFICATION forming part of Letters Patent No. 233,056, dated October 5, 1880.

Application filed July 14, 1880. (No model.)

*To all whom it may concern:*

Be it known that I, WILLIAM WIMPEE, a citizen of the United States, residing at Rome, in the county of Floyd and State of Georgia, have invented certain new and useful Improvements in a Combined Clod-Cutter and Harrow; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to agricultural implements; and the novelty consists in a combined clod-cutter and harrow suitably coupled, whereby the lumps of earth and clods are cut and broken and the same are harrowed or put in proper condition to receive the seed.

It also consists, in combination with the harrow, of handles attached to an adjusting-plate moving on the arc of a circle, whereby a tall or short person may be able to follow the implement.

It also consists in the novel combination and arrangement of parts, as will be hereinafter more fully set forth and specifically claimed.

Figure 1 is a perspective view of the combined implement. Fig. 2 is a plan view of the harrow, showing the same in full and dotted lines. Fig. 3 is a bottom view of a rake sometimes substituted for the harrow. Fig. 4 is a side view of means for adjusting the height of the handles.

In the annexed drawings, forming a part of this specification, the letter A represents a frame composed of the side pieces, $a\ a$, and transverse bars $b\ b$. To the front cross bar or beam is suitably attached a pole, B, for a double team. When a single horse is employed the shafts or other connecting means are attached to the forward ends of the side pieces through the agency of suitable hitching means at these points.

Within the frame A are journaled two revolving cylinders, C C, which I denominate "clod-cutters." Each clod-cutter is composed of two end heads, $d\ d$, and a series of transverse bars, $e$, forming cutting-blades or knives. The heads are made of cast-iron and the blades of iron or steel, and the latter are fastened to the former by means of bolts. These clod-cutters are arranged upon a shaft extending transversely through the center of the frame, and have their end bearings preferably in journal-boxes, although in the drawings I have shown the bearings in the side bars. To the front cross-bar, at a point between the clod-cutters, is erected a driver's seat, D, substantially as seen in Fig. 1 of the drawings. The rear cross-bar of the frame, at or near its middle, is formed or provided with a hook or other device to receive the coupling attachment of a harrow or other implement.

The letter E represents a harrow composed of the central bar, $h$, diagonal side bars, $i$, and the diagonal rear bars, $k$. The center bar is provided with a series of perforations near its outer end, for the purpose hereinafter stated. The diagonal side bars, $i\ i$, are pivoted at their converging ends to the fixed transverse bar or bars $m'$ at the forward end of the central bar, and the rear ends of these bars are likewise pivotally connected to the diagonal bars $k$, which are also pivotally attached to the sleeve or collar $l'$, passing over the central bar. To the side bars, $i$, near their forward ends, are pivoted the arms $m\ m$, the inner ends of which are pivoted to the collar or sleeve $l''$. The side and diagonal bars, $i$ and $k$, are provided with the usual harrow-teeth.

By this construction and arrangement of the bars constituting the harrow I am enabled to increase or decrease the width of the harrow by adjusting the arms and the sleeves. If I desire to cover the full track made by the clod-cutters preceding the harrow, I adjust the side bars and diagonal arms of the harrow to the position substantially as indicated by full lines in Fig. 2 of the drawings, and to decrease the width of the harrow I adjust the bars and diagonal arms in the manner as indicated by dotted lines in the same figure. These adjusted positions are maintained by keys or pins passing through perforations in the sleeve and central bar.

To the rear end of the center bar of the harrow is attached a semicircular piece or block, H, and to this block, at the sides, are pivoted the handles I I by means of a bolt passing through the handles and the block.

Fitted over the semicircular surface of the block is a curved slotted plate, K, which is held in contact with the block by means of the central vertical bolt, L, as shown in Fig. 4 of the drawings. This curved plate is formed with a lug for the reception of the upper bolt of the handle, and a series of angular notches arranged on opposite sides of the slot-walls to receive the upper square portion of the bolt.

To adjust the harrow-handles so as to suit persons of different heights, the nut of the bolt is loosened and the bolt raised to the extent of the length of the square portion of the bolt, so that it can be raised out of the angular notches of the curved plate to permit the same to slide backward or forward to suit the desired height.

The letter M represents a rake, of the shape and construction as seen in Fig. 3 of the drawings, which may be used in lieu of the harrow for raking purposes. This rake is provided with a chain and hook to connect the same with the clod-cutter frame.

The teeth of the harrow are designed to be attached by means of bolts and nuts.

By reference to Fig. 1 it will be observed that the cylinders with the cutting-blades will cut or disintegrate the clods, and the harrow, immediately following, will pulverize the soil and put it in condition to receive the seed in broadcast sowing.

I am aware that rollers and a harrow, also a clod-breaker and a roller, have been combined in the order named; but these combinations of implements are incapable of putting the ground in proper condition for broadcast seed-sowing.

The clod-cutting cylinders being opened permit the earth to pass through easily, and obviate any possible clogging of the cylinders.

I claim the right to vary the construction of the parts without departing from the spirit of my invention.

What I claim as my invention, and desire to secure by Letters Patent, is—

1. The combination, substantially as hereinbefore described, of a clod-cutter and a harrow coupled together and arranged in the order named, for the purposes set forth.

2. In combination with a harrow having a semicircular block, to which the handles are pivoted, and carrying a clamping-bolt, a slotted curved plate moving over the semicircular block, and having attached thereto a pair of handles, substantially as and for the purpose set forth.

3. The adjustable harrow composed of the central bar, diagonal side bars, and the diagonal rear bars, with pivoted intermediate arms and sliding sleeves, substantially as described.

In testimony whereof I affix my signature in presence of two witnesses.

WILLIAM WIMPEE.

Witnesses:
M. A. WIMPEE,
J. M. WIMPEE.